United States Patent
Korakin et al.

(10) Patent No.: US 9,734,692 B2
(45) Date of Patent: Aug. 15, 2017

(54) METHOD FOR POISITIONING A RESIDENTAL PEST DETECTOR AND A SYSTEM FOR DETECTING RESIDENTIAL PESTS

(71) Applicants: Yosef Korakin, Rockville, MD (US); Nir Geva, Nes Ziona (IL)

(72) Inventors: Yosef Korakin, Rockville, MD (US); Nir Geva, Nes Ziona (IL)

(73) Assignee: WALL SENSOR LTD., Ramot Hashavim (IL)

( * ) Notice: Subject to any disclaimer, the term of this patent is extended or adjusted under 35 U.S.C. 154(b) by 0 days.

(21) Appl. No.: 14/835,872

(22) Filed: Aug. 26, 2015

(65) Prior Publication Data

US 2016/0364974 A1   Dec. 15, 2016

Related U.S. Application Data

(63) Continuation-in-part of application No. 14/739,041, filed on Jun. 15, 2015.

(51) Int. Cl.
*G01S 15/00* (2006.01)
*G08B 21/18* (2006.01)
*G01S 15/04* (2006.01)

(52) U.S. Cl.
CPC ............. *G08B 21/18* (2013.01); *G01S 15/04* (2013.01)

(58) Field of Classification Search
CPC ........................................................ G01S 15/04
USPC .............................. 367/93; 340/573.1, 573.2
See application file for complete search history.

(56) References Cited

U.S. PATENT DOCUMENTS

| | | |
|---|---|---|
| 5,491,467 A | 2/1996 | Tracy et al. |
| 5,571,967 A * | 11/1996 | Tanaka ................. G01N 3/42 340/573.2 |
| 6,001,065 A | 12/1999 | DeVito |
| 6,023,223 A | 2/2000 | Baxter, Jr. |
| 6,081,481 A | 6/2000 | Sabatier et al. |
| 6,255,652 B1 | 7/2001 | Moyer |
| 6,263,311 B1 | 7/2001 | Dildy |
| 6,525,658 B2 | 2/2003 | Streetman et al. |
| 6,552,647 B1 | 4/2003 | Thiessen |
| 6,691,070 B1 | 2/2004 | Williams et al. |
| 7,057,516 B2 * | 6/2006 | Donskoy ............... A01M 1/026 324/637 |
| 8,838,260 B2 | 9/2014 | Pachet et al. |
| 2002/0096638 A1 | 7/2002 | Toomey |
| 2003/0039612 A1 | 2/2003 | Ovington |
| 2004/0162710 A1 | 8/2004 | Schwartz |
| 2006/0028345 A1* | 2/2006 | Lee ..................... A01M 1/24 340/573.2 |
| 2007/0096928 A1 | 5/2007 | Lee |
| 2007/0132598 A1 | 6/2007 | Wijenberg et al. |

(Continued)

FOREIGN PATENT DOCUMENTS

BE   WO 2012136647 A1 *  10/2012 ............ A01M 23/08

*Primary Examiner* — Kerri McNally
(74) *Attorney, Agent, or Firm* — Reches Patents (57) ABSTRACT

A detection system for detecting a residential pest, the detection system may include a housing, a vibration sensor that is configured to sense vibration signals; a processor that is configured to process the vibration signals and detect residential pest activities; a coupler that once connected to a metal-including element of a resident vibrationally couples the metal-including element to the vibration sensor.

14 Claims, 9 Drawing Sheets

(56) References Cited

U.S. PATENT DOCUMENTS

| | | |
|---|---|---|
| 2007/0192032 A1 | 8/2007 | David et al. |
| 2008/0069364 A1 | 3/2008 | Itou et al. |
| 2009/0093917 A1 | 4/2009 | Smith |
| 2010/0201529 A1 | 8/2010 | Garrick |
| 2011/0002196 A1 | 1/2011 | Weiser et al. |
| 2011/0144829 A1 | 6/2011 | Kim et al. |
| 2011/0190008 A1 | 8/2011 | Eronen et al. |
| 2013/0041856 A1 | 2/2013 | Benitez et al. |
| 2013/0322215 A1 | 12/2013 | Du et al. |

* cited by examiner

METHOD FOR POISITIONING A RESIDENTAL PEST DETECTOR AND A SYSTEM FOR DETECTING RESIDENTIAL PESTS

RELATED APPLICATIONS

This application is a continuation in part of U.S. patent application Ser. No. 14/739,041 filing date Jun. 15, 2015, which is incorporated herein by its entirety.

BACKGROUND OF THE INVENTION

Residential pests cause damages to buildings. In many cases the residential pests are hard to detect due to a low acoustic footprint.

There is a growing need to increase the probability of detecting residential pests.

SUMMARY

According to an embodiment of the invention there may be provided a detection system for detecting a residential pest.

According to an embodiment of the invention there may be provided a detection system for detecting a residential pest, the detection system may include a housing, a vibration sensor that is configured to sense vibration signals; a processor that is configured to process the vibration signals and detect residential pest activities; a coupler that once connected to a metal-including element of a resident vibrationally couples the metal-including element to the vibration sensor.

The coupler may include a pair of coupling elements that are coupled to the vibration sensor to provide a differential vibration signal to the vibration sensor.

The vibration sensor has two interfaces for mechanically coupling the vibration sensor to the pair of coupling elements.

The coupler may include multiple pins that fit an electrical socket of the resident and are configured to supply power to the detection system once inserted in the electrical socket and also to supply vibration signals to the vibration sensor.

The coupler may include multiple pins that fit an electrical socket of the resident and are configured to supply, once inserted in the electrical socket, vibration signals to the vibration sensor; wherein the multiple pins are prevented from supplying power to the detection system from the electrical socket.

The detectors may include vibration sensors of multiple types; wherein the multiple types comprise acoustic sensors, mechanical vibration sensors, seismic vibration sensors.

The detection system further may include an alert generator that may be configured to generate a pest alert and to transmit the pest alert over a wireless network.

The detection system further may include an alert generator that may be configured to generate a pest alert and to transmit the pest alert over a wireless network and to a server.

The detection system further may include a trigger module that may be configured to generate triggering signals for inducing a residential pest to increase an acoustic-detectable activity of the residential pest; and wherein the vibration sensor may be configured sense signals responsive to a generation of the triggering signals.

The trigger module may be a transmitter; wherein the vibration sensor may be an acoustic sensor; wherein the triggering signals are acoustic triggering signals that are transmitted by the transmitter; wherein the acoustic sensor may be configured to sense acoustic signals responsive to the a transmission of the acoustic triggering signals.

The processor may be configured to search for an acoustic signature of the residential pest in the acoustic signals sensed by the acoustic sensor.

The processor may be configured to find suspected acoustic signatures of the residential pest in the acoustic signals sensed by the acoustic sensor; wherein the detection system may be configured to send the sending information about the suspected acoustic signatures to a remote computer for validating the suspected acoustic signatures.

According to an embodiment of the invention there may be provided a detection system for detecting a residential pest, the detection system may include: a housing, a vibration sensor that may be configured to sense vibration signals; a processor that may be configured to process the vibration signals and detect residential pest activities; multiple pins that fit an electrical socket of the resident and are configured to supply power to the detection system once inserted in the electrical socket; wherein once the multiple pins are inserted in the electrical socket the vibration sensor faces the electrical socket and may be pressed against the electrical socket.

According to an embodiment of the invention there may be provided a method for detection of a residential pest, the method may include coupling a detection system to a metal-including element of a resident; receiving, via vibration sensor that may be vibrationally coupled to the metal-including element, vibrations that propagate over the metal-including element; and processing, by a processor, the vibration signals to detect residential pest activities.

The metal-including element may belong to a water supply of the resident.

The metal-including element may be a structural element of the resident.

The metal-including element may belong to the electric supply system of the resident.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "vibration sensor" refers to any type of detector that is capable of detecting vibrations. The vibrations can be acoustic vibration and/or mechanical vibrations. Non-limiting example of vibration sensors include acoustic sensors, mechanical vibration sensors (such as accelerometers), and seismographic sensors.

The term "metal including element" refers to an element that includes metal. The metal including element may include additional non-metal materials.

The term "residential pest" is a pest that resided in a residential building, in proximity to a residential building, beneath a residential building, and the like. Non-limiting examples of residential pests are termites and rodents.

Non-limiting examples of a metal including element include electrical wires, electrical sockets, metal pipes, metal rods, metal profiles and the like.

Wood suffers from a relatively poor sound and vibration conduction. This relatively poor conduction prevents the detection of noises and/or vibration generated by residential pests.

According to an embodiment of the invention there is provided a detection system that includes a coupler for coupling the detection system to metal including elements of the resident and thus benefit from the superior sound and/or vibration conductivity of metal including element.

According to another embodiment of the invention the detection signals may also include a triggering module for triggering residential pests to generate sound and/or vibration thereby increasing the chances of detecting the residential pests. The triggering module can be also vibrationally coupled to the coupler thereby increasing the effectiveness of the provision of the triggering signals. A non-limiting example of a detection system that includes a triggering module is illustrated in U.S. patent application Ser. No. 14/739,041 which is incorporated herein by reference.

Figure 1:
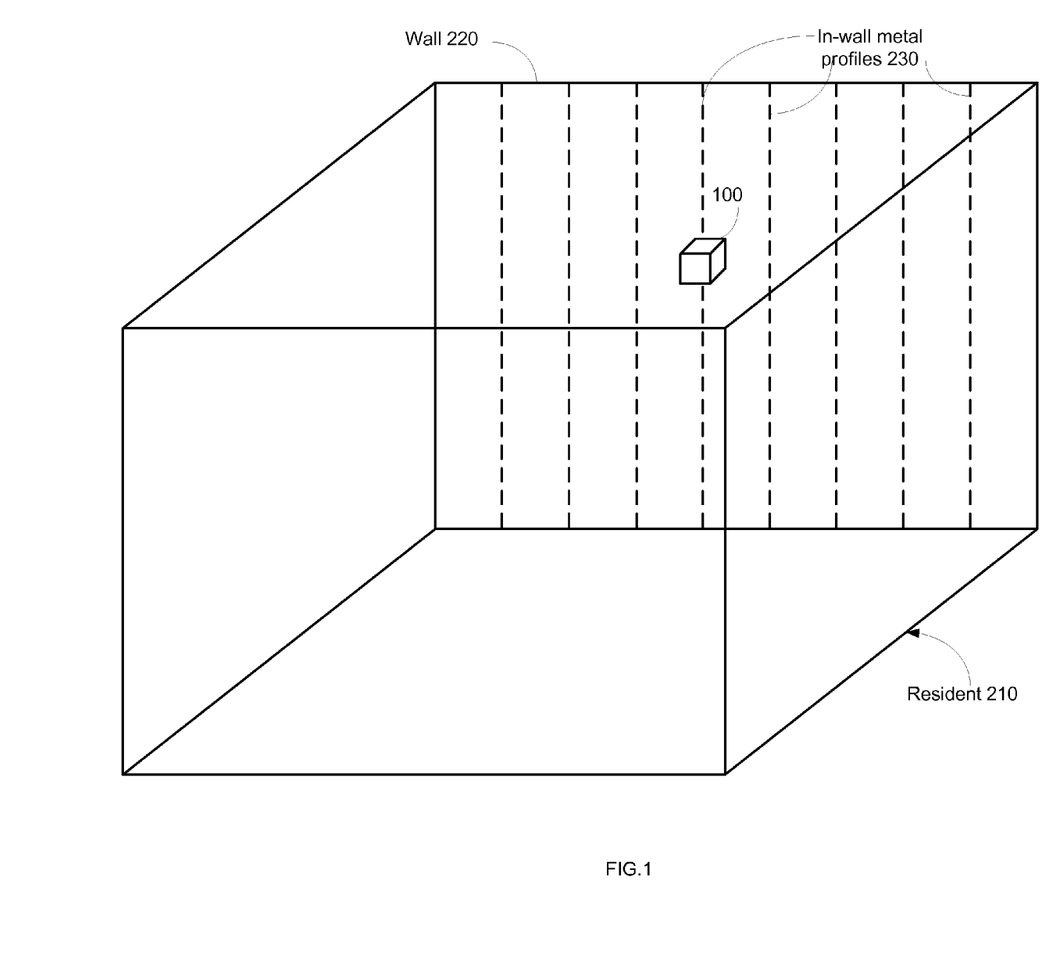
FIG. 1 illustrates a resident and a detection system according to an embodiment of the invention.

FIG. 1 illustrates a resident 200 and a detection system 100 that is positioned in proximity to an in-wall metal profile (of multiple in-wall metal profiles 230 that are embedded in wall 220).

According to an embodiment of the invention the detection system is not spaced apart from the in-wall metal profile but is vibrationally coupled, by using a coupler, to the in-wall metal profile. In this case the coupled can be a screw, a pin or any other protrusion that penetrates the wall and contacts the in-wall profile. A hole for receiving the coupler and providing access to the in-wall profile can be drilled in the wall. Alternatively the coupler itself may be rotated or otherwise inserted in tot wall thereby forming the hole.

Figure 2:
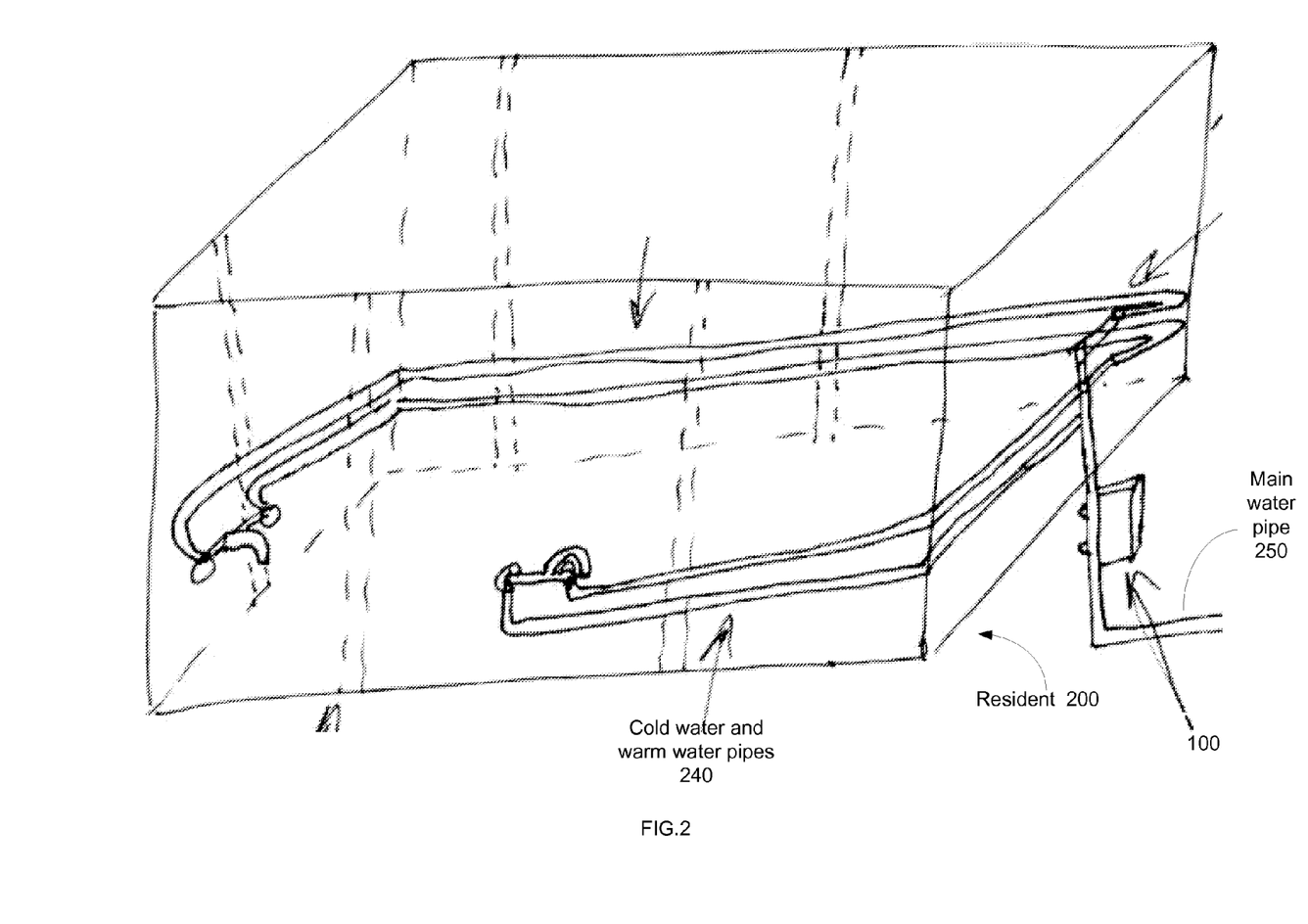
FIG. 2 illustrates a resident and a detection system according to an embodiment of the invention.

FIG. 2 illustrates a resident 200 and a detection system 100 that is connected to a main water pipe 250 of a residential supply and drainage system according to an embodiment of the invention.

It is noted that the detection system 100 can be contacted to or be proximate to (and may even contact) any one of the cold water and worm water pipes 250 of the residential supply and drainage system or to any metal including element of that system.

Figure 3:
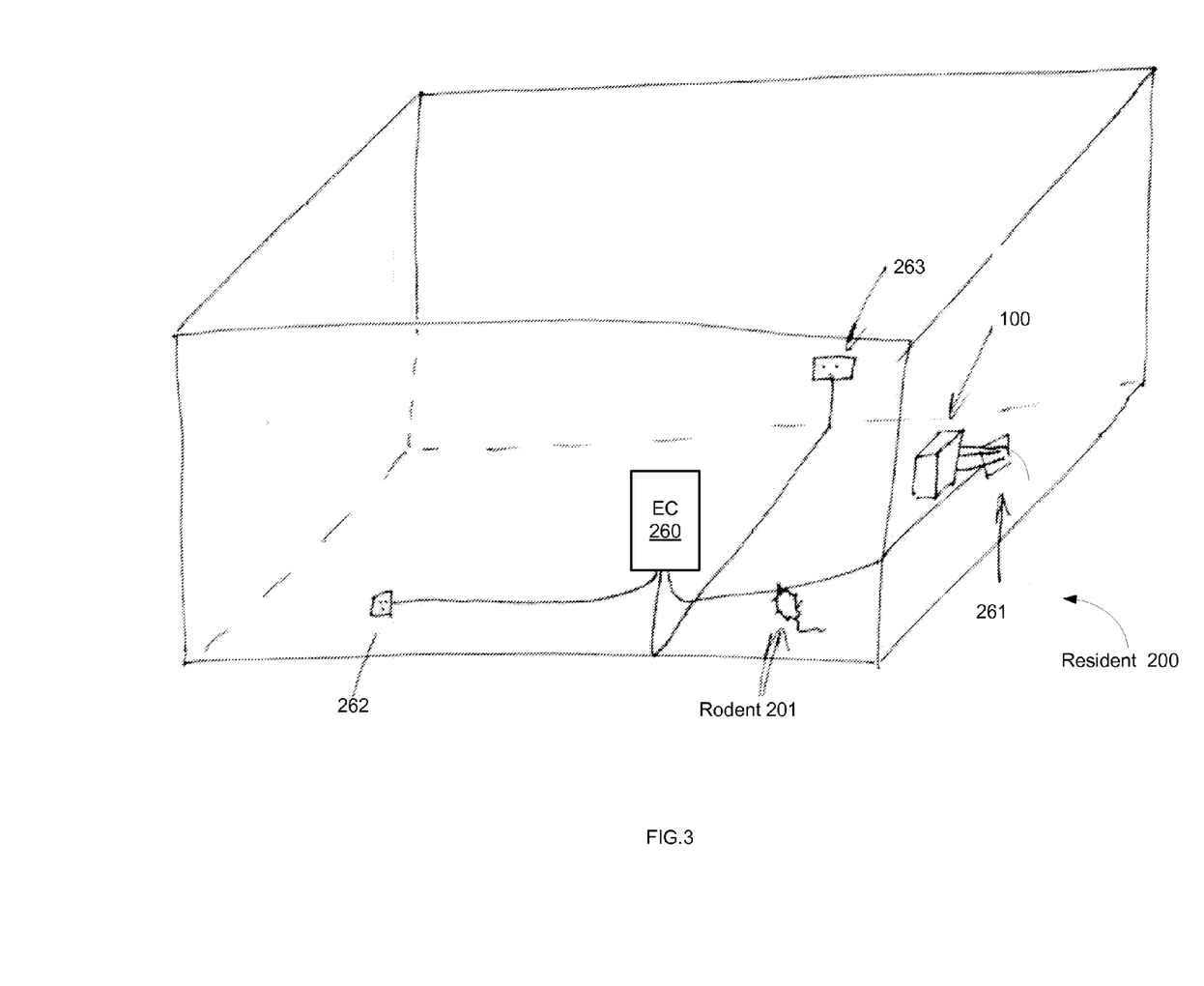
FIG. 3 illustrates a resident and a detection system according to an embodiment of the invention.

FIG. 3 illustrates a resident 200 and a detection system 100 that is connected to an electrical socket 261 of a residential power supply system according to an embodiment of the invention.

The residential power supply system includes an electrical cabinet (EC) 260 three sockets 261, 262 and 263 and multiple power cables. FIG. 3 illustrates a rodent 201 that chews a power cable.

It is noted that the detection system 100 can be contacted to or be proximate to (and may even contact) any of the power cables/the electrical cabinet.

In FIGS. 1-3, detection system 100 may be replaced by any one or detection systems 101, 102, 103, 104 and 105.

Figure 4:
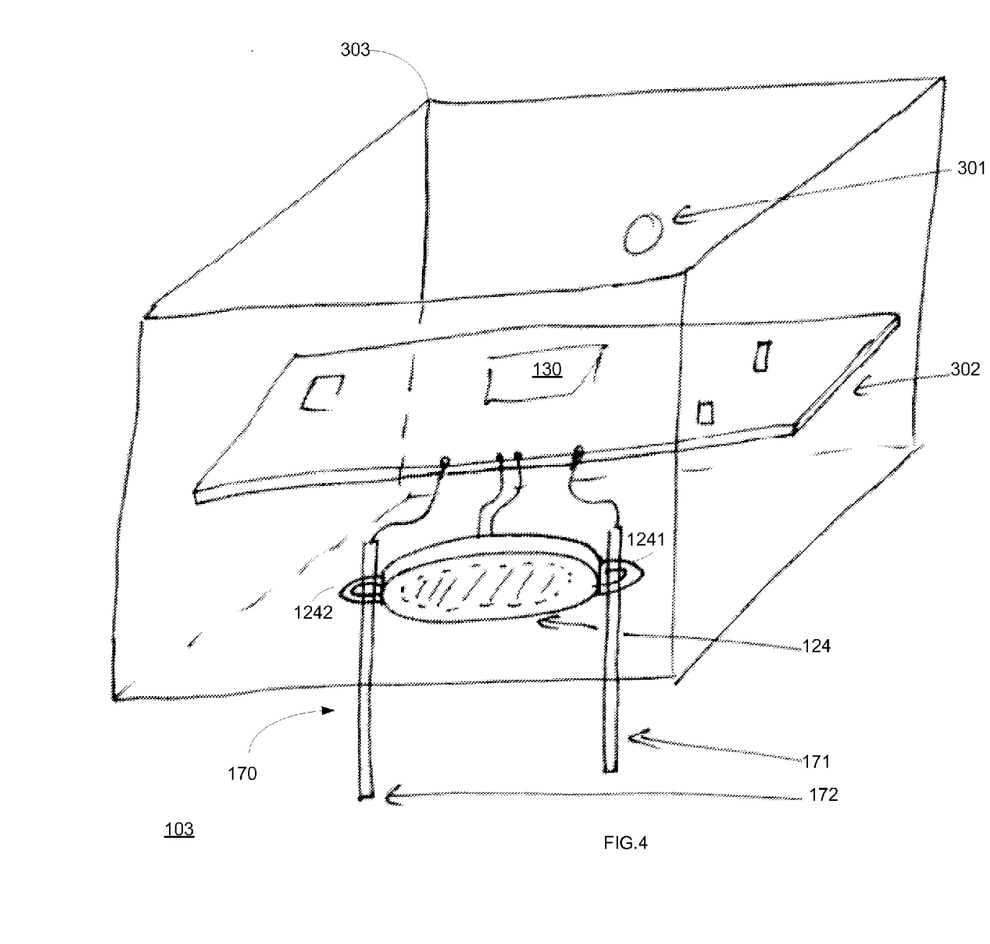
FIG. 4 illustrates a detection system according to an embodiment of the invention.

FIG. 4 illustrates a detection system 103 according to an embodiment of the invention.

Detection system 103 includes housing 303, light emitting diode (LED) 301, a printed circuit board (PCB) 302, an acoustic sensor 124, a pair of pins 171 and 172 and various electrical components such as processor 130 mounted on PCB 302.

Pins 171 and 172 are shaped and sized to fit the openings of an electrical socket.

The detection system 103 can connected to (and even pressed against) an electrical socket while pins 171 and 172 enter the electrical socket and are capable of supplying both power to the detection system and also convey acoustic signals or to acoustic sensor 124.

Acoustic sensor 124 includes two interfaces 1241 and 1242 for mechanically coupling the acoustic sensor to the pair of coupling elements.

The acoustic sensor may calculate or sense a difference between acoustic signals received the two interfaces to provide a differential acoustic signal, may add the signals received from the two interfaces or apply any other function on those signals.

According to an embodiment of the invention pins 171 and 172 are used for conveying acoustic signals but do not provide power to the detection system. The detection system may have a battery or another coupling element for power supply.

Figure 5:
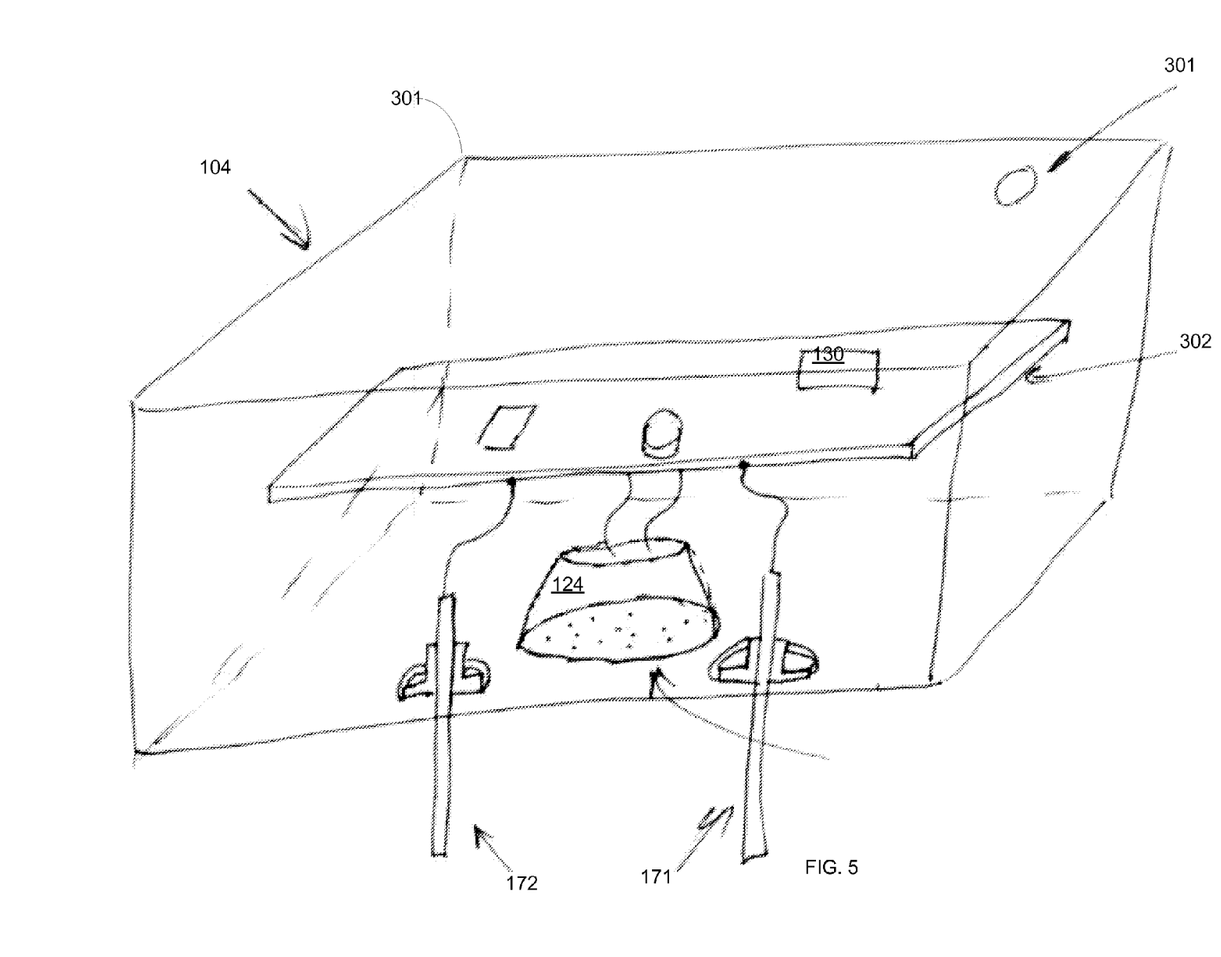
FIG. 5 illustrates a detection system according to an embodiment of the invention.

FIG. 5 illustrates a detection system 104 according to an embodiment of the invention.

Detection system 104 includes housing 303, light emitting diode (LED) 301, a printed circuit board (PCB) 302, an acoustic sensor 124, a pair of pins 171 and 172 and various electrical components such as processor 130 mounted on PCB 302.

Detection system 104 differs from detection system 103 by lacking a contact between acoustic sensor 124 and pins 171 and 172. Furthermore—acoustic sensor 124 is pressed against the electrical socket.

Figure 6:
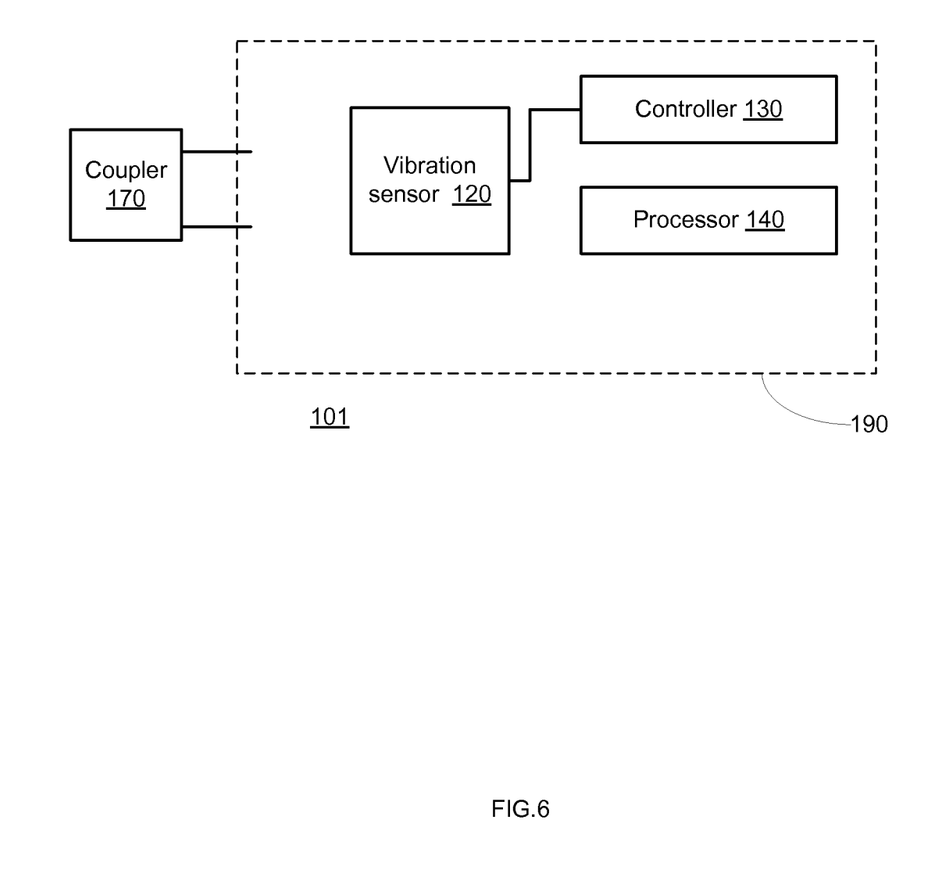
FIG. 6 illustrates a detection system according to an embodiment of the invention.
Figure 7:
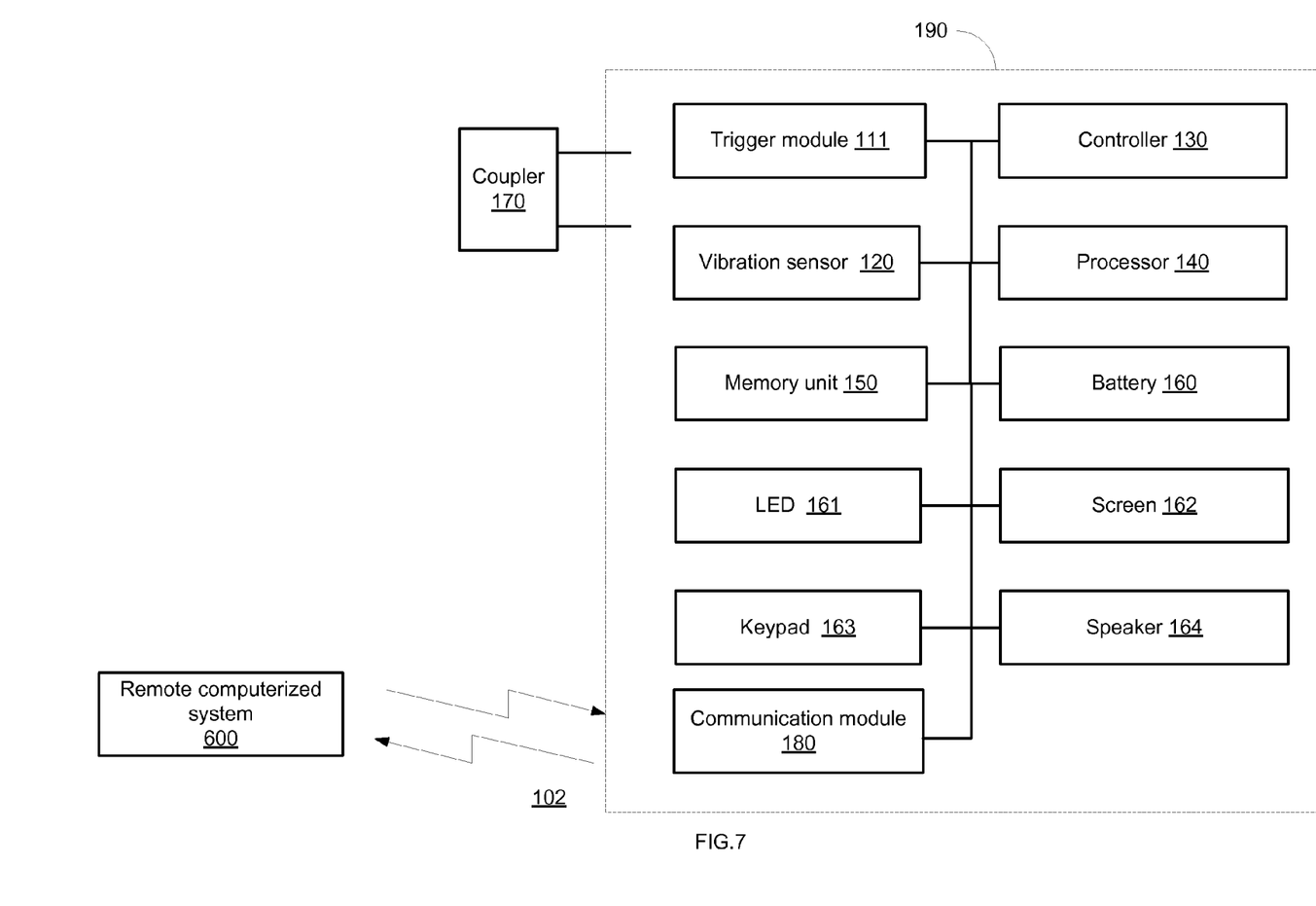
FIG. 7 illustrates a detection system according to an embodiment of the invention.
Figure 8:
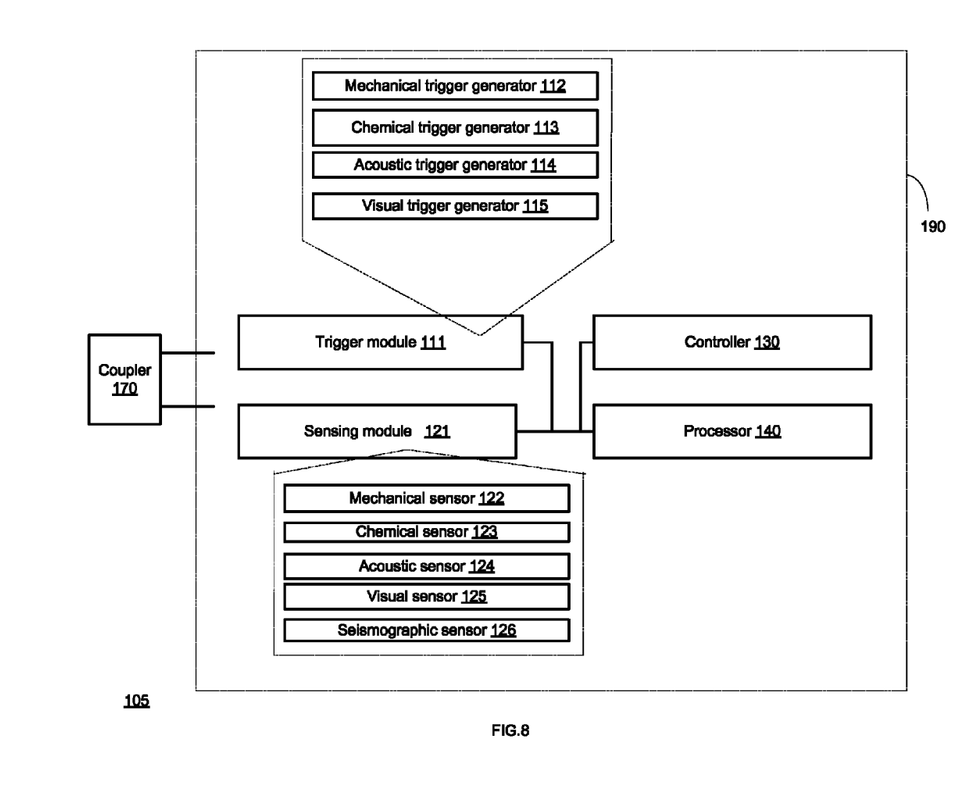
FIG. 8 illustrates a detection system according to an embodiment of the invention.

FIGS. 6-8 illustrate detection systems 101, 102 and 105 according to various embodiments of the invention.

Each one of detection systems 101, 102 and 105 of FIGS. 6-8 and 100, 103 and 104 of FIGS. 1-5 may include (see for example system 107 of FIG. 6) a housing (such as housing 190 of FIG. 6), a vibration sensor 120 that is configured to sense vibration signals; a processor 140 that is configured to process the vibration signals and detect residential pest activities; a coupler 170 that once connected to a metal-including element of a resident vibrationally couples the metal-including element to the vibration sensor; and a controller 130 for controlling the processor 140 and the transmitter 110.

The vibration sensor 120 may be a microphone, a piezoelectric sensor, a vibration sensor, a non-contact radiation based acoustic sensor (such as a laser for illuminating a structural element of the building, a receiver for receiving scattered and/or reflected light) or a combination of one or more of the microphone, the piezoelectric sensor, the vibration sensor, and the non-contact radiation based acoustic sensor.

The detection signals generated by the vibration sensor 120 should be processed in order to detect residential pest acoustic signatures. A residential pest acoustic signature identifies the residential pest. The processing can be done solely by processor 140 or only partially by processor 140. The processor may detect the residential pest acoustic signature or may perform only a part of the processing (for example perform a partial processing and/or detect suspected residential pest acoustic signature) and the other part of the processing can be done by another entity such as a computerized device (such as remote computerized system 600 of FIG. 7) that may detect the residential pest acoustic signature with a higher certainty.

Systems 102 of FIG. 7 and system 105 of FIG. 8 further include trigger module 111.

Trigger module 111 may include at least one out of a mechanical trigger module 112, a chemical trigger module 113, and an acoustic trigger module 114 (such as a transmitter) for generating triggering module.

The mechanical trigger module 112 may include a vibrator, a hammer or any other mechanical element that is configured to introduce mechanical triggers (such as vibrations).

The mechanical triggers may be provided to a frame of a house or any other structural element that interfaces with the detection unit 101. The chemical trigger module 113 may release gaseous triggering signals.

Detection system 101 also differs from detection system 100 having a sensing module 121 that may include at least one out of mechanical sensor 122 (such as a seismographic sensor 126), chemical sensor 123, acoustic sensor 124 and visual sensor 125. The visual sensor 125 may include a light sensor, an infrared sensor, and the like.

It is noted that the sensing module and the triggering module may be of the same type (for example—an acoustic triggering module and an acoustic sensor).

It is noted that the sensor and the triggering modules may differ by type (for example—a chemical triggering module and an acoustic sensor).

Assuming, for example, that the triggering module outputs acoustic triggering signals then the acoustic triggering signals are aimed to cause the residential pest to increase its acoustic-detectable activity—for example by performing movements that may be detected by the acoustic sensor, by generating acoustic waves that may detected by the acoustic sensor and the like.

The acoustic triggering signals may represent a sound associated with a threat to the residential pest, a sound made by a natural enemy of the residential pest, a distress signals sounded by the residential pest, a sound that represents a man-made hazard.

Each one of detection systems 102 and 105 may perform multiple iterations of (a) transmission of acoustic triggering signals, and (b) sensing of acoustic signals responsive to a transmission of the acoustic triggering signals.

The detection unit may transmit different acoustic triggering signals at different points of time. For example, the detection unit may transmit different acoustic triggering signals during different iterations.

One or more acoustic triggering signals that differ from each other may be aimed to different residential pests or may be aimed to the same residential pest.

The selection of which acoustic triggering signals to transmit may be responsive to at least one of the following parameters: (i) expected residential pets, (ii) detected residential pest, (ii) outcome of one or more sensing periods during which the acoustic sensor sensed acoustic signals.

The selection of which acoustic triggering signals to transmit can be made by controller 130, can be dictated (by a component that may be part of detection unit 100 or may reside outside detection unit 100) to the controller 130, can be made a processor (that may belong to detection unit or may reside outside detection unit 100), and the like.

Each one of detection systems 102 and 105 may transmit, during different points of time, acoustic triggering signals associated with different threat levels. For example, the detection unit may start by transmitting acoustic triggering signals of a first threat level and when the transmission of the acoustic triggering signals result in a detection of a residential pest acoustic signature, then detection system 102 or 105 may transmit transmitting acoustic triggering signals of a second threat level that may cause the residential pest to leave the premises. Yet for another example detection system 102 or 105 may change the acoustic triggering signals thereby changing the threat level associated with the acoustic triggering signals for other reasons. All of the acoustic triggering signals may be aimed for detecting the residential pest and not for cause the residential pest to leave the premises.

FIG. 8 illustrates various other components that may be included in detection system 102. These components (all or only some) may be included in each one of detection systems 100, 102, 103, 104 and 105 according to various embodiments of the invention.

The various other components may include memory unit 150, energy source such as battery 160, a communication module 180 for communicating with another detection system and/or with another system while using short range and/or long range transmission, and one or more man machine interface components such as light emitting diode (LED) 161, screen 162, keypad 163 and speaker 164.

The memory unit 150 may include a volatile memory unit, a non-volatile memory unit and the like.

The controller 130 and the processor 140 may be integrated with each other.

It is noted that detection unit 101 may be equipped with the one or more man machine interface components when detection unit 101 is intended to directly interface with a human. Alternatively, the detection unit 101 may communicate with another detection unit (not shown) that will be equipped with the one or more man machine interface components.

Figure 9:
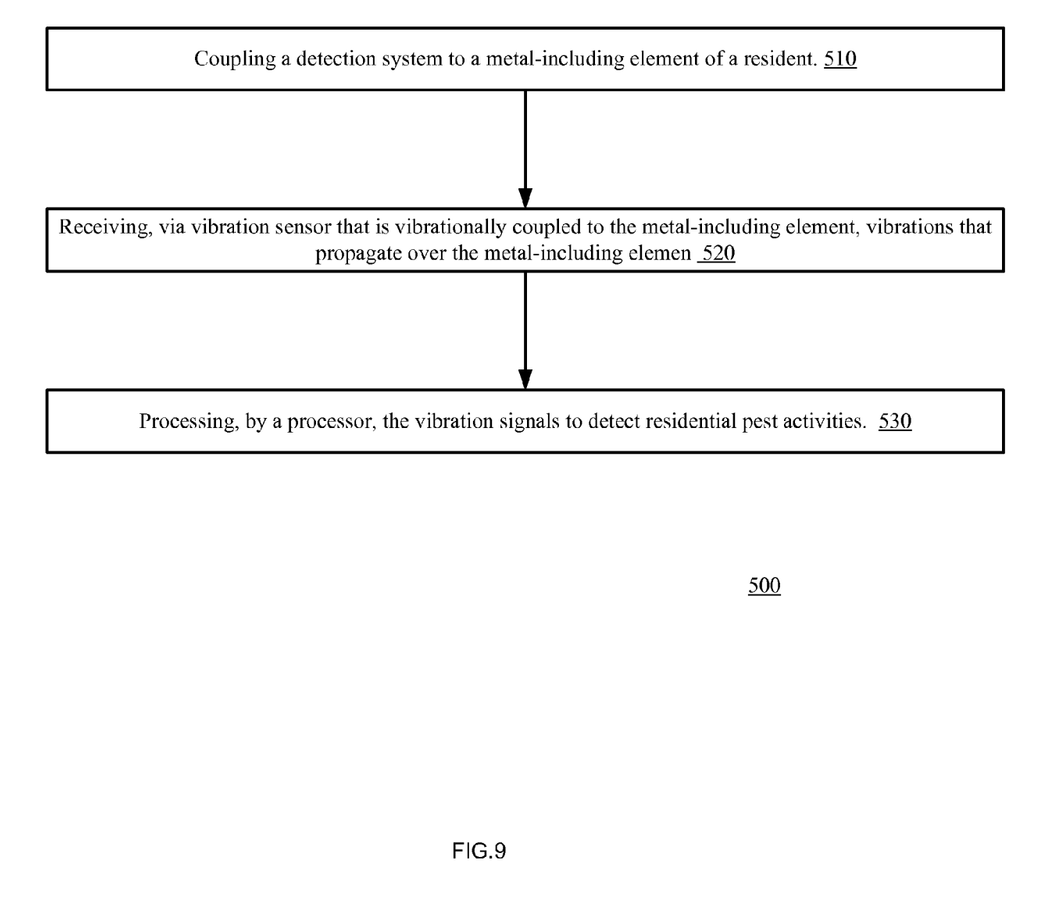
FIG. 9 illustrates a method according to an embodiment of the invention.

FIG. 9 illustrates method 500 according to an embodiment of the invention.

Method 500 may include step 510 of coupling a detection system to a metal-including element of a resident.

Step 510 may be followed by step 520 of receiving, via vibration sensor that is vibrationally coupled to the metal-including element, vibrations that propagate over the metal-including element.

Step 520 may be followed by step 530 of processing, by a processor, the vibration signals to detect residential pest activities.

Step 530 may be followed (not shown) transmitting triggering signals, generating an alert and the like.

While the previous figures referred to a detection system that has a transmitter for transmitting acoustic triggering signals and has a sensor for sensing acoustic signals, the invention is not limited to the acoustic domain. Triggering signals may include at least one out of acoustic triggering signals, mechanical triggering signals chemical triggering signals and visual triggering signals. The sensed signals may include at least one out of acoustic sensed signals, mechanical sensed signals, chemical sensed signals and visual sensed signals.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A detection system for detecting a residential pest, the detection system comprises: a housing, a vibration sensor that is configured to sense vibration signals; a processor that is configured to process the vibration signals and detect residential pest activities; a coupler that once connected to a metal-including element of a residence vibrationally couples the metal-including element to the vibration sensor; and wherein the coupler comprises a pair of coupling elements that are coupled to the vibration sensor to provide a differential vibration signal to the vibration sensor.

2. The detection system according to claim 1 wherein the vibration sensor has two interfaces for mechanically coupling the vibration sensor to the pair of coupling elements.

3. A detection system for detecting a residential pest, the detection system comprises: a housing, a vibration sensor that is configured to sense vibration signals; a processor that is configured to process the vibration signals and detect residential pest activities; a coupler that once connected to a metal-including element of a residence vibrationally couples the metal-including element to the vibration sensor; wherein the coupler comprises multiple pins that fit an electrical socket of the residence and are configured to supply power to the detection system once inserted in the electrical socket and also to supply vibration signals to the vibration sensor.

4. A detection system for detecting a residential pest, the detection system comprises: a housing, a vibration sensor that is configured to sense vibration signals; a processor that is configured to process the vibration signals and detect residential pest activities; a coupler that once connected to a metal-including element of a residence vibrationally couples the metal-including element to the vibration sensor; wherein the coupler comprises multiple pins that fit an electrical socket of the residence and are configured to supply, once inserted in the electrical socket, vibration signals to the vibration sensor; wherein the multiple pins are prevented from supplying power to the detection system from the electrical socket.

5. The detection system according to claim 1 comprising vibration sensors of multiple types; wherein the multiple types comprise acoustic sensors, mechanical vibration sensors, seismic vibration sensors.

6. The detection system according to claim 1 further comprising an alert generator that is configured to generate a pest alert and to transmit the pest alert over a wireless network.

7. The detection system according to claim 1 further comprising an alert generator that is configured to generate a pest alert and to transmit the pest alert over a wireless network and to a server.

8. The detection system according to claim 1 further comprising a trigger module that is configured to generate triggering signals for inducing a residential pest to increase an acoustic-detectable activity of the residential pest; and wherein the vibration sensor is configured sense signals responsive to a generation of the triggering signals.

9. The detection system according to claim 8 wherein the trigger module is a transmitter; wherein the vibration sensor is an acoustic sensor; wherein the triggering signals are acoustic triggering signals that are transmitted by the transmitter; wherein the acoustic sensor is configured to sense acoustic signals responsive to a transmission of the acoustic triggering signals.

10. The detection system according to claim 9, wherein the processor is configured to search for an acoustic signature of the residential pest in the acoustic signals sensed by the acoustic sensor.

11. The detection system according to claim 10, wherein the processor is configured to find suspected acoustic signatures of the residential pest in the acoustic signals sensed by the acoustic sensor; wherein the detection system is configured to send information about the suspected acoustic signatures to a remote computer for validating the suspected acoustic signatures.

12. A detection system for detecting a residential pest, the detection system comprises: a housing, a vibration sensor that is configured to sense vibration signals; a processor that is configured to process the vibration signals and detect residential pest activities; multiple pins that fit an electrical socket of the residence and are configured to supply power to the detection system once inserted in the electrical socket; wherein once the multiple pins are inserted in the electrical socket the vibration sensor faces the electrical socket and is pressed against the electrical socket.

13. A method for detection of a residential pest, the method comprising:
coupling a detection system to a metal-including element of a residence; wherein the metal-including element belongs to a water supply of the residence;

receiving, via vibration sensor that is vibrationally coupled to the metal-including element, vibrations that propagate over the metal-including element; and processing, by a processor, the vibration signals to detect residential pest activities.

14. A method for detection of a residential pest, the method comprising: coupling a detection system to a metal-including element of a resident; receiving, via vibration sensor that is vibrationally coupled to the metal-including element, vibrations that propagate over the metal-including element; and processing, by a processor, the vibration signals to detect residential pest activities; wherein the metal-including element belongs to the electric supply system of the resident.

* * * * *